United States Patent
Wright et al.

[11] 3,899,933
[45] Aug. 19, 1975

[54] TRANSMISSION WITH ANTIBACKLASH MEANS

[75] Inventors: Dexter V. Wright, Pittsburgh, Pa.;
John M. Hague, III, Buffalo, N.Y.

[73] Assignee: White-Westinghouse Corporation, Cleveland, Ohio

[22] Filed: Jan. 2, 1974

[21] Appl. No.: 430,108

[52] U.S. Cl. ................................... 74/440; 74/409
[51] Int. Cl.² ........................................ F16H 55/18
[58] Field of Search ................. 74/409, 440; 68/133

[56] References Cited
UNITED STATES PATENTS

| | | | |
|---|---|---|---|
| 1,796,992 | 3/1931 | Helm et al. | 74/440 |
| 2,275,100 | 3/1942 | Burnett | 74/440 |
| 2,397,777 | 4/1946 | Colman | 74/409 |
| 2,666,344 | 1/1954 | Boeck et al. | 74/409 |
| 3,264,847 | 8/1966 | Johnson et al. | 68/133 X |
| 3,487,706 | 1/1970 | Resener | 74/440 X |

*Primary Examiner*—Samuel Scott
*Assistant Examiner*—Lance W. Chandler

[57] ABSTRACT

A transmission is shown for converting a rotational input to an oscillatory output. The output shaft is geared to an oscillating gear which in turn is driven by a connecting rod from a rotating gear. A spring is attached between a pin extending from the connecting rod generally adjacent the oscillating gear, and the housing of the transmission, with the spring having a non-stressed position during the intermediate portion of the stroke of the connecting rod but generally resisting the motion of the rod to either extremity of the stroke. The force of the spring on the pin results in a retarding torque being applied to the rotating gear during those periods of the stroke that the load being driven by the output shaft is applying an accelerating torque. The spring is chosen so that the retarding torque is larger than the accelerating torque thereby preventing torque reversals on the rotating gear.

8 Claims, 6 Drawing Figures

TRANSMISSION WITH ANTIBACKLASH MEANS

BACKGROUND OF THE INVENTION

1. Field of the Invention

This invention relates to transmissions in general and more particularly to means within a transmission for positively preventing gear backlash and associated impact noise in a transmission for converting rotational input to an oscillatory or reciprocatory output for imparting like motion to generally high inertial loads.

2. Description of the Prior Art

Gear backlash and accompanying impact noise are well known characteristics of drive trains having meshing gears which, by necessity, must include tolerances between the teeth of the mating gears to properly interface. The backlash occurs whenever there is a torque reversal such as when the rotational input of a driving gear slows and the inertia of the load associated with the driven gear is sufficient to maintain the higher speed. In such instances torque is then put into the driving gear from the load side. This is referred to as a torque reversal, causing the back face of the gears to contact and generally accompanied by an impacting noise.

The above torque reversal and impact is especially prevalent in transmissions which convert rotational input to an oscillatory output so that at the end of each oscillatory stroke the inertia of the load causes the output shaft to tend to continue in one direction whereas the gear providing the oscillating output is slowing to ultimately stop and reverse direction. It is during this period of each cycle that the load inertia imparts a torque reversal within the transmission. Such oscillatory output transmissions are commonly found in driving the agitator structure in automatic washers and in this environment the impact noise can be quite annoying.

Structure for eliminating gear backlash is well known and broadly includes: a split gear generally comprising a pair of matched component gears face to face on a hub and either oppositely biased to apply opposing torque between a pair of matched teeth, (U.S. Pat. No. 3,035,454) or frictionally maintained in a backlash absorbing orientation, (U.S. Pat. No. 1,124,107). Another well known structure includes mounting a gear on a hub for limited relative movement and includes a pair of parallel gear trains having biasing means either opposing this movement or aiding this movement to maintain the same face of the mating teeth in engagement. (U.S. Pat. No. 2,737,056.) The above mechanisms have some or all of the disadvantages of: Increasing the power required to drive the transmission due to losses involved and increasing teeth wear, and/or increasing manufacturing expenses in that more parts are required and the assemblies are generally more complex.

SUMMARY OF THE INVENTION

The invention provides a spring biasing a pin extending from the connecting rod of a transmission, with the spring resisting movement of the connecting rod to either extremity of its oscillatory stroke thereby imposing a retarding torque on the rotating gear. Thus, during the portion of the oscillatory stroke that the load inertia tends to pull the rotating gear, e.g., just prior to each reversal of the oscillating gear, the retarding torque is sufficient to absorb the inertial force of the load and prevent a torque reversal within the transmission. The power required to bias the spring, as the connecting rod is driven in one direction beyond the intermediate position, is returned to the overall system, except for normal losses, when the direction of the connecting rod is reversed at the extremity of its stroke to move in the direction urged by the spring until it again moves beyond the intermediate unbiased position.

DESCRIPTION OF THE PREFERRED EMBODIMENTS

Figure 1:
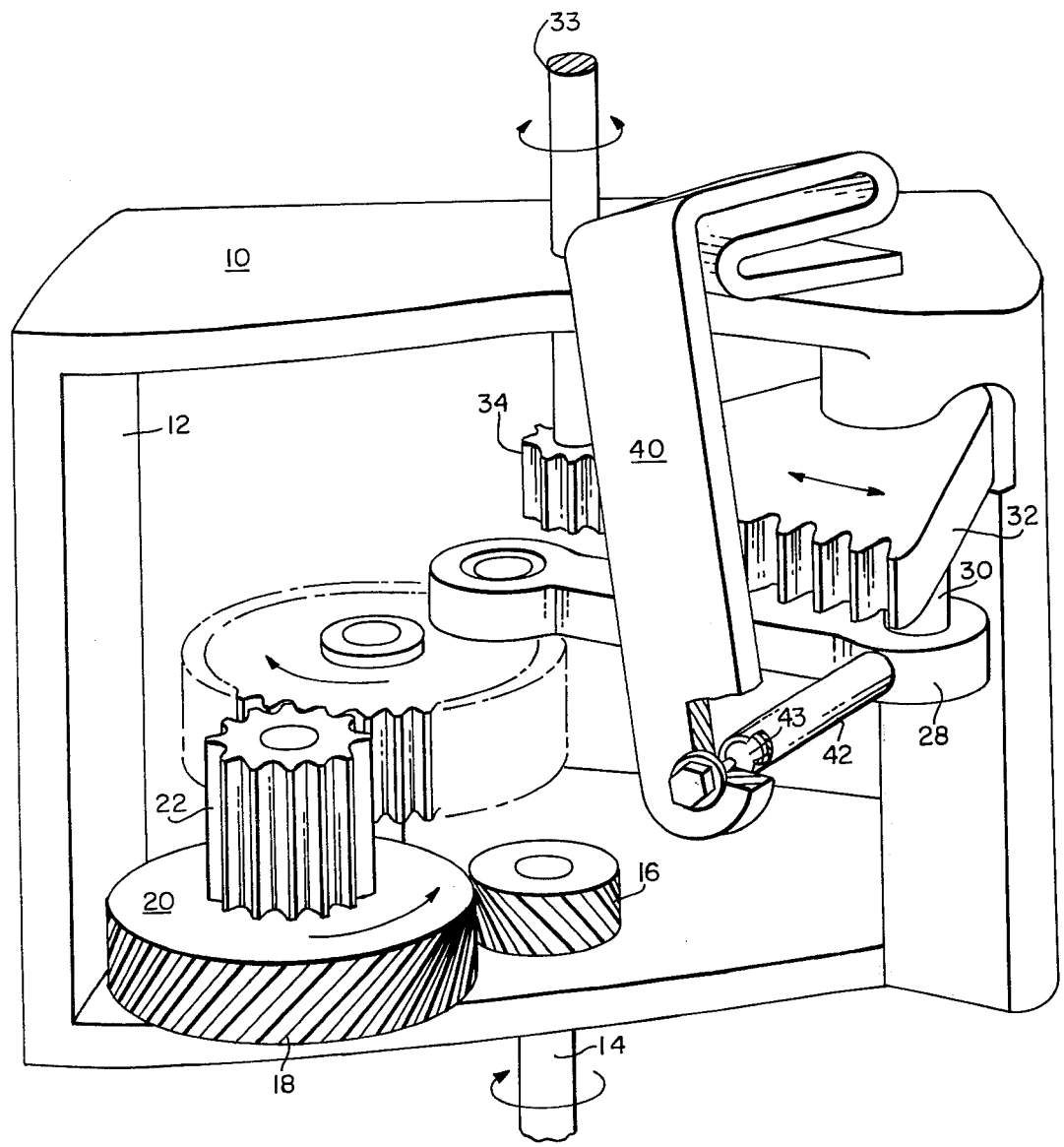
FIG. 1 is a perspective view of a well known transmission incorporating the antibacklash means of the present invention.

The present invention, as shown in FIG. 1, is incorporated in a transmission which has general utility in a centerpost agitator washer and reference is made to U.S. Pat. No. 3,264,847 of common assignee which shows such a transmission in that environment. As the present invention is only concerned with the gear train within the transmission which couples the motor to the agitator, FIG. 1 shows only that portion. As shown in FIG. 1, the transmission 10 includes a yoke 12 providing a frame or housing for supporting the bearings (not shown) which in turn rotationally support the gears of the transmission in a well known manner. Thus, an input shaft 14 is received through the yoke and keyed to an input pinion gear 16. Gear 16 is in turn coupled to one gear face 18 of a dual gear 20, and the other gear face 22 of the dual gear is drivingly connected to a rotating crank gear 24. A crank pin 26 extends from one side of the crank gear 24 and drivingly engages a connecting rod 28 extending between the crank gear 24 and a similar pin 30 on an oscillating sector gear 32. Sector gear 32 in turn drivingly engages an output pinion gear 34 keyed to an output shaft 33 extending through the yoke 12. In the top load agitator washer, the output shaft is keyed to agitator structure as shown in the above identified patent.

It is seen that the rotational drive of the input shaft 14 results in driving the output shaft 36 in an oscillatory mode, as the rotation of the crank gear 24 drives the connecting rod in a well known reciprocal movement, rocking the sector gear 32 between two extreme positions.

Figure 2:
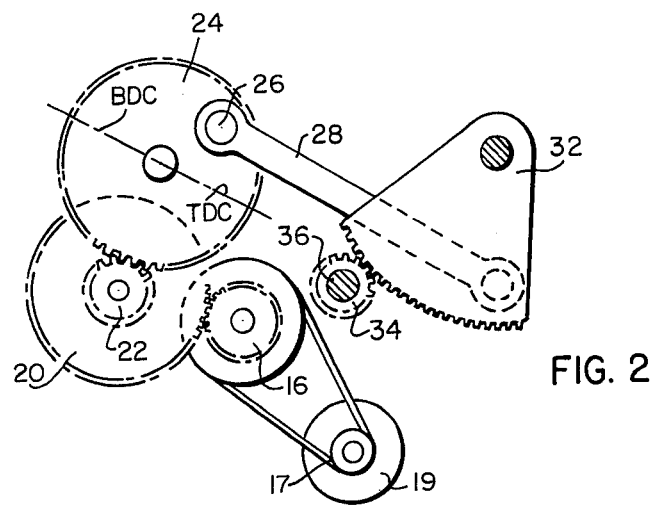
FIG. 2 is a schematic plan view of the transmission of FIG. 1.

Referring now to FIG. 2 to further explain the well known transmission, it is seen that the input pinion 16 is driven by a belt and pulley drive 17 from a motor 19. Also, the two extreme positions of the oscillatory stroke of the connecting rod 28 and sector gear 32 are obtained when the crank gear 24 is at either the position identified as TDC (top dead center) or BDC (bottom dead center).

Thus, in this transmission, as the crank gear approaches either TDC or BDC, the speed of the sector gear 32 slows, and in fact stops and reverses direction at either extreme position; however, the load being driven by the output shaft 36 having been given an initial impetus in one direction, has an inertial force that attempts to maintain the load moving at some intermediate speed (allowing for slippage and lag between the water load and the agitator) that is at least greater than the driving speed of the sector gear 32. When this happens, the output pinion 34 in fact becomes a driving pinion which in turn ends to drive the sector gear 32. This driving force is in turn transmitted back through the connecting rod 28 to the crank gear 24 with the result being that as the crank gear is approaching either TDC or BDC it becomes driven by the inertial force of the load.

Although each pair of meshing gears to some extent experiences a backlash as the driven load changes the driving force, it was found that the major impacting occurred in the meshing teeth between the crank gear 24 and gear 22 of the dual gear 20.

Referring again to FIG. 1, the structure of the present invention which eliminates the backlash and the accompanying impacting noise comprises a spring arm 40 having one end securely attached to the yoke 10 (as by welding) and the opposite end engaging a lever 42 extending from the connecting rod 28. As is clearly shown, the spring arm 40 has a configuration permitting oscillatory movement of the free end which engages the lever 42 with an inherent resilient spring force urging the free end to an unbiased position.

The engagement between the lever 42 on the connecting rod 28 and the free end of the spring arm 40 includes a ball and socket connection 43 permitting pivotal movement at this connection point to accommodate the changing angular orientation between the spring arm and the pin and prevent the introduction of any twisting force at this connection.

The spring arm 40 is attached at a position such that it has an unbiased or an at-rest position at some point intermediate of its travel between the positions it assumes when the crank gear is at TDC and BDC.

Figure 3:
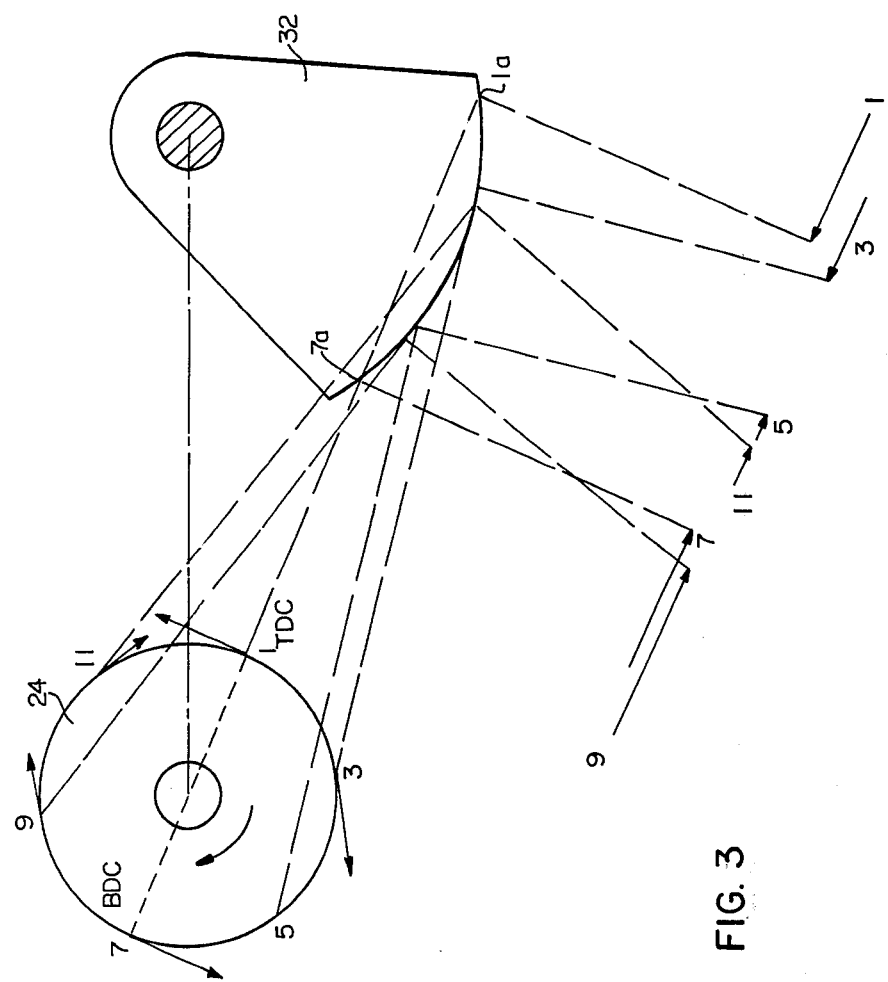
FIG. 3 is a force-vector diagram of the retarding torque developed by the antibacklash means.

Reference is now made to FIG. 3 to graphically illustrate the path of the point of connection between the spring arm 40 and the lever 42 for each complete cycle of the crank gear 24. Thus, positions 1a and 7a on the sector gear identify the extreme points of travel of the lever 42 where it is connected to the connecting rod 28 and correspond to the positions TDC and BDC respectively. It is noted that because of the constant angular relationship between the lever 42 and the crank arm 28 (a right angle) the extremities of travel of the point of connection between the pin and the spring 40 are obtained at two positions in the cycle other than either TDC or BDC. However, in this instance, the spring has an unbiased or equilibrium position at a point midway between the positions it assumes when the connecting rod is at TDC and BDC. Thus, knowing the perpendicular distance from the equilibrium point to the connecting point between the pin and spring throughout the path of this connecting point, and knowing the spring constant, the force on the pin 42 can be determined and thus the resultant moment transmitted to the crank gear 24 can be calculated.

Still referring to FIG. 3, the force on the lever 42 due to the spring arm 40 is illustrated by vectors at representative positions indicating by their length, their relative amount. Through unknown mathematical relationships, the resultant torque they provide on the crank gear can also be calculated and these resultant torques are also represented by force vectors. For the purpose of this illustration, forces that result in a clockwise torque will be referred to as accelerating forces and forces that result in a counterclockwise torque will be referred to as retarding torque.

Thus, it is seen, that as the crank gear 24 approaches TDC and BDC (positions 1 and 7 respectively) there exists a retarding torque of a known amount. Observing the force vectors on the crank gear at each corresponding position of the connecting point between the spring and the pin the following types of forces are seen to be introduced by the spring arm 40: at top dead center (position 1) it is seen that a retarding torque is present; when the connecting point is in position 3 it is seen that there is an accelerating torque; when it is at position 5 there is essentially no force transmitted to the crank gear due to the spring arm (because of its proximity to the unbiased position); again at position BDC (position 7) there is a retarding torque which again changes to an accelerating torque as the connecting point passes to position 9; the accelerating torque becoming less at position 11 and again reversing to a retarding torque as the crank gear passes through TDC.

Thus it is seen that the spring arm 40 can be chosen to have a spring constant such that the resultant torque at the crank gear can be retarding torque exceeding the accelerating torque induced by the inertial force of the driven load so that the accelerating torque introduced by the load is, completely negated by the retarding torque supplied by the spring. Thus, a net positive torque is required by the input pinion 16 at all instants during a complete cycle of the crank gear and the crank gear teeth do not go through their backlash. This prevents any torque reversal in the transmission.

Figure 4:
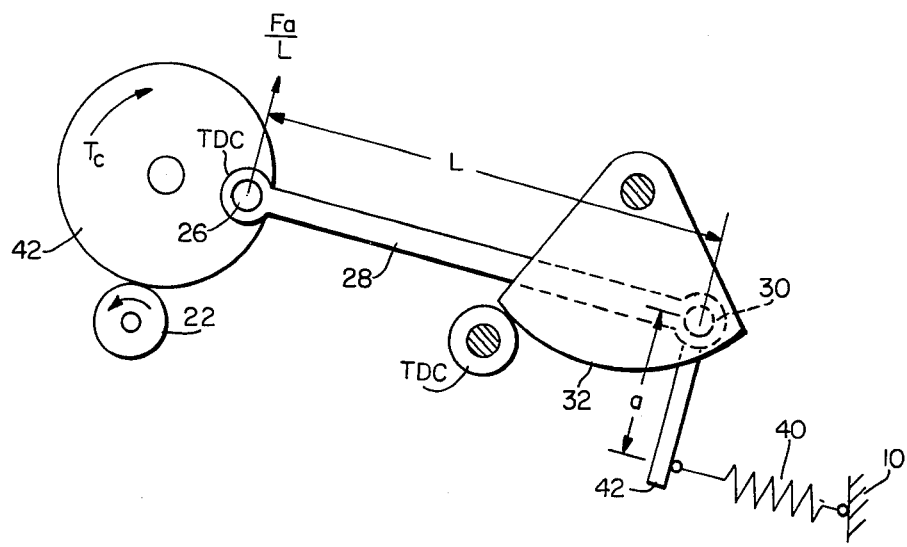
FIGS. 4 and 5 are simplified schematic views illustrating the principle of the present invention at the extreme positions of the stroke of the connecting rod.
Figure 5:
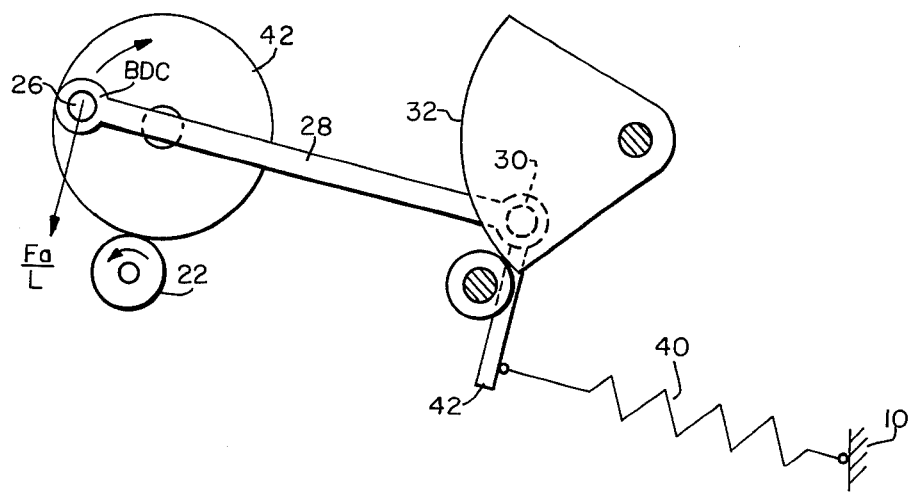

The above concept may be more readily understood with reference to FIGS. 4 and 5 which shown a simplified version of the principles of this invention with the crank gear in TDC (FIG. 4) and BCC (FIG. 5). Thus, in FIG. 4 the spring 40 is illustrated as being in a compressed condition resulting in a biasing force to the right. This force results (by a summation of forces) in a quantity represented as $Fa/L$ which is the connecting rod force on the crank pin 26 and is in a direction opposite to the direction of rotation (shown by the arrow) of crank gear 24 thereby requiring a positive torque input to gear 24 from the motor to maintain its continued rotation.

In FIG. 5 the spring 40 is illustrated as being in tension so that in this instance the spring force (F) is toward the left. Again the force $Fa/L$ of the connecting rod on the pin 26 is in a direction opposite to that of the direction of rotation of crank gear 24. Therefore these figures illustrate the basic reason a positive torque is required in these two extreme positions. However FIG. 3 is a more accurate description of the relationship between the relative position of the gears in the transmission and spring force on the crank gear as it relates to the preferred embodiment.

Figure 6:
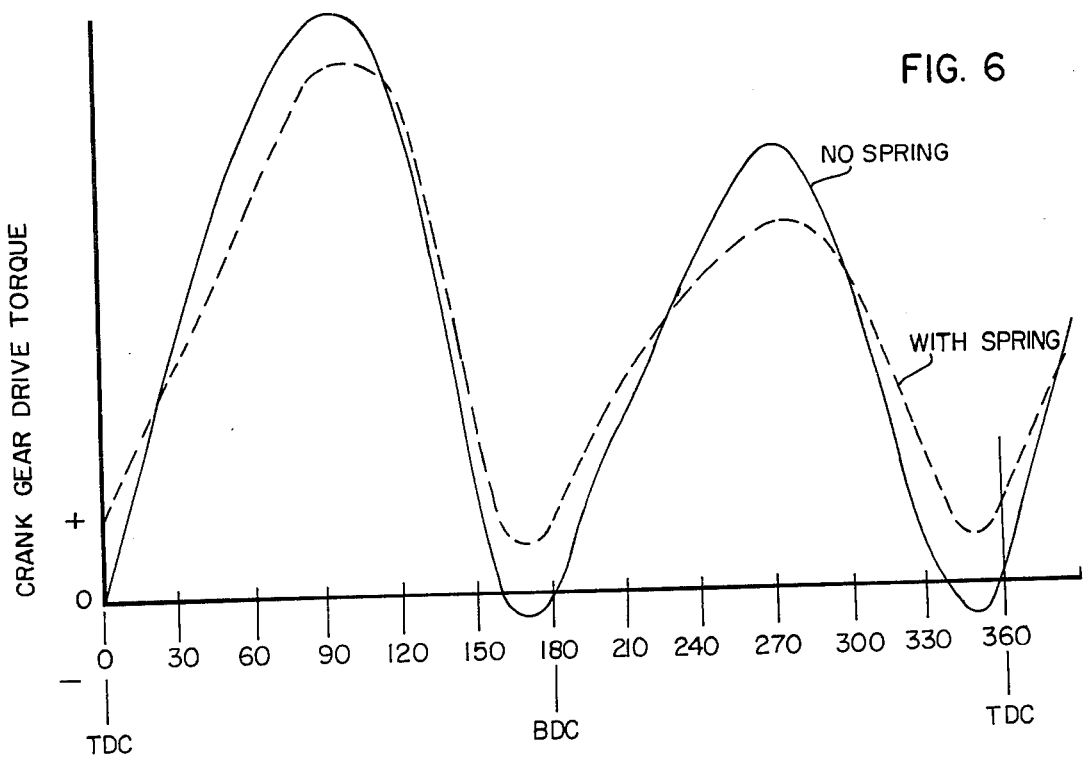
FIG. 6 is a graphic representation of the torque on the crank gear of the transmission both before and after the antibacklash means has been attached.

FIG. 6 is a graph of the relative values of torque input required in a transmission without the antibacklash means of the present invention (solid line) and with the means of the present invention (broken line). In this graph it is seen that the antibacklash means, in addition to preventing the torque from ever being negative (a torque reversal) it reduces the peak torque required.

This is accounted for by the fact that during those portions of the cycle which had heretofore required the peak torque input, the force on the pin 26 due to the spring 40, is in a direction to aid in the rotation of gear 24 in the desired direction. Thus the required torque input by the pinion gear is less. It must be pointed out however, that the total power required whether the antibacklash means of the present invention is incorporated or not remains the same. (i.e. the area under the respective curves representing the theoretically required power.)

Although various types of helical, torsion or cantilever springs can be connected between the yoke and the pin 42 on the connecting rod 28 and done so in various ways to accomplish the purpose of the invention which is to provide a retarding torque to the crank gear at the proper time and in the proper amount to prevent torque reversal, the specific working embodiment had the following physical characteristics:

The spring constant at the point of attachment to the pin 42 was approximately 60 pounds per inch; the point of attachment had approximately 1.8 inches of travel between its extreme positions; and, pin 42 from the centerline of the connecting rod 28 to the point of attachment to the spring 40 was approximately 1.85 inches.

Under these conditions, the backlash of a working centerpost agitator washing machine was virtually eliminated when operated under the most adverse conditions for inducing backlash.

The stiffness of the spring arm, at its neutral or at rest position and the length of the projecting pin are design parameters that can be easily varied to accomplish the objective of no torque reversals.

We claim as our invention:

1. Antibacklash means for transmission having support structure for mounting a rotating input shaft and an output means for driving a relatively high-inertia load, said output means having a repetitive cyclical movement defining opposed extreme positions and means also mounted on said support structure for providing positive driving engagement between said input shaft and said output means, said engagement means including a rotatively driven crank gear coupled to said input shaft for a driving force therebetween and a connecting rod rotationally connected at one end to said crank gear, the opposed end of said connecting rod pivotally coupled to said output means, and wherein said antibacklash means comprises:

means including a yieldable member for applying a rotational force to said crank gear, the direction and magnitude of said rotational force being related to the relative position of said output means in said output cycle such that at least during the portion of the output cycle in which said output means is in or adjacent either said extreme positions, said rotational force is greater in magnitude than the inertial force transmitted to the crank gear by said load and in a direction opposing the direction of rotation of said crank gear, whereby, the crank gear is maintained free of torque reversals caused by the inertia of said load.

2. Structure according to claim 1 wherein said means for applying said rotational force to said crank gear comprises:

a lever extending for a predetermined length from said connecting rod generally adjacent said output means, and yieldable biasing means attached to said lever for providing a rotational force on said connecting rod about said coupling and in a direction opposing the rotational force transmitted to said rod from said driving force as said output means approaches either of said extreme positions, said first named rotational force being greater than the inertial force transmitted to said crank gear through said rod.

3. Structure according to claim 2 wherein said biasing means comprises:

a resilient spring arm having one end securely attached to said support structure of said transmission and the opposed generally free end attached to said lever, said resilient spring arm normally biasing said lever to a position intermediate from the position said lever assumes when said output means is in either of said extreme positions.

4. Structure according to claim 3 wherein the connection between said spring arm and said lever includes a ball and socket structure permitting relative movement of said spring arm with respect to said lever.

5. Antibacklash means in a transmission for imparting a cyclical oscillatory motion to agitator structure of an automatic clothes washer as driven from a motor, said transmission including a rotating crank gear drivingly coupled to said motor, a connecting rod rotationally connected to one end to said crank gear, the opposite end of said rod pivotally connected to an oscillating sector gear drivingly coupled to said agitator structure, said gears being mounted on support structure in said transmission and wherein said antibacklash comprises:

means including a yieldable member for applying a rotational force on said crank gear with the direction and magnitude of said force being related to the relative orientation of said agitator and said oscillatory cycle, such that at least during the portion of the oscillatory motion of said agitator structure in which said agitator structure stops to reverse direction, said rotation force is greater in magnitude than the inertial force of the clothes load transmitted to the crank gear and in a direction opposing the direction of rotation of said crank gear as driven by said motor, whereby:

said crank gear is free of torque reversals caused by the inertia of said clothes load.

6. Structure according to claim 5 wherein said means for applying a rotational force on said crank gear comprises:

a lever extending from said connecting rod generally adjacent said pivotal connection between said opposed end and said output means and generally in the plane parallel to the plane of movement of said connecting rod; and, biasing means attached to said lever for opposing the movement of said lever as said agitator structure approaches either of said positions of direction reversal.

7. Structure according to claim 6 wherein said biasing means comprises a resilient spring arm having one end securely attached to said support structure and the opposed end attached to said lever, said resilient spring arm normally biasing said lever to a position intermediate from the positions it assumes when said agitator structure reverses direction of rotation, and whereby the length of said lever to the point of attachment to said spring arm is a factor in determining said opposing force on said connection between said crank gear and said connection rod.

8. Structure according to claim 7 wherein the connected between said spring arm and said lever includes a ball and socket structure permitting variable angular orientation to said spring arm with respect to said lever.

* * * * *

UNITED STATES PATENT OFFICE
CERTIFICATE OF CORRECTION

PATENT NO. : 3,899,933
DATED : August 19, 1975
INVENTOR(S) : Dexter V. Wright, John M. Hague, III It is certified that error appears in the above-identified patent and that said Letters Patent are hereby corrected as shown below:

Under the caption "SUMMARY OF THE INVENTION", Column 1, Line 65, change "e.g." to -- i.e. --.

Under the caption "DESCRIPTION OF THE PREFERRED EMBODIMENTS", Column 2, Line 48, after the words "ion gear 34 keyed to an output shaft" change "33" to -- 36 --.

Under Column 3, Line 10, change "ends" to -- tends --.

Column 3, Line 67, (otherwise identified as the last line on the page in Column 3) after the word "Through" change "unknown" to -- known --. Column 2, line 53, after "shaft" change "36" to -- 33 --.

Signed and Sealed this sixth Day of January 1976

[SEAL]

Attest:

RUTH C. MASON
*Attesting Officer*

C. MARSHALL DANN
*Commissioner of Patents and Trademarks*